(12) United States Patent
Naito

(10) Patent No.: US 8,493,602 B2
(45) Date of Patent: Jul. 23, 2013

(54) MANAGEMENT SYSTEM, MONITORING APPARATUS AND METHOD THEREOF

(75) Inventor: Yoshiko Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 13/021,490

(22) Filed: Feb. 4, 2011

(65) Prior Publication Data

US 2011/0216354 A1  Sep. 8, 2011

(30) Foreign Application Priority Data

Feb. 8, 2010 (JP) ................................ 2010-025867

(51) Int. Cl.
*G06K 15/00* (2006.01)
*G06F 3/12* (2006.01)
*G06F 3/00* (2006.01)

(52) U.S. Cl.
USPC ................... 358/1.15; 358/1.14; 710/3; 710/9

(58) Field of Classification Search
None
See application file for complete search history.

(56) References Cited

U.S. PATENT DOCUMENTS

| | | |
|---|---|---|
| 5,084,875 A | 1/1992 | Weinberger |
| 2002/0194214 A1 | 12/2002 | Fukazawa |
| 2007/0035638 A1 * | 2/2007 | Naitoh ........................ 348/226.1 |

FOREIGN PATENT DOCUMENTS

| | | |
|---|---|---|
| CN | 101197726 A | 6/2008 |
| EP | 429056 A2 | 5/1991 |
| EP | 996253 A2 | 4/2000 |
| EP | 1903439 A1 | 3/2008 |
| JP | 2004-227104 A | 8/2004 |
| JP | 2005-222161 A | 8/2005 |
| JP | 2006-228099 A | 8/2006 |
| JP | 2007-018500 A | 1/2007 |

* cited by examiner

*Primary Examiner* — Thomas Lett

(74) *Attorney, Agent, or Firm* — Canon U.S.A., Inc., IP Division

(57) ABSTRACT

A management system includes an image forming apparatus and a monitoring apparatus. The monitoring apparatus includes a determination unit configured to determine whether the image forming apparatus has a transmission control function for performing change of a transmission destination of collected operational information, a transmission unit configured to transmit to the image forming apparatus having the transmission control function, a command for setting the monitoring apparatus as a transmission destination of the operational information, and transmission setting in which a scheme for acquiring counter information related to charging is set, and a scheme for acquiring failure information is set, and a verification unit configured to verify matching in the counter information. The image forming apparatus is configured to perform transmission of the operational information to the monitoring apparatus in accordance with the command and the transmission setting.

13 Claims, 14 Drawing Sheets

FIG. 7

| TRANSMISSION METHOD NAME | NUMBER OF TYPES | IDENTIFICATION INFORMATION | ANCILLARY INFORMATION |
|---|---|---|---|
| Method1 | 1 | STATUS CHANGE | 0 |
| Method2 | 2 | ERROR NUMBER OF PRINTED SHEETS 1 | 0 |
| Method3 | 2 | NUMBER OF PRINTED SHEETS 1<br>NUMBER OF PRINTED SHEETS 2 | 1 |
| Method4 | 1 | NUMBER OF USES OF PARTS | 0 |

FIG. 8

| DEVICE ID | TRANSMISSION METHOD NAME | | | |
|---|---|---|---|---|
| | Method1 | Method2 | Method3 | Method4 |
| A0001 | PULL | PULL | PULL | PULL |
| A0002 | PUSH | PUSH | PULL | PUSH |

FIG. 10

| | FLAG | BASE POINT TIME | TRANSMISSION INTERVAL |
|---|---|---|---|
| Method1 | 1 | 2009/12/1 0:00 | -1 |
| Method2 | 1 | 2009/12/1 0:00 | -1 |
| Method3 | 0 | 2009/12/1 0:00 | -1 |
| Method4 | 1 | 2009/12/1 0:00 | 72 | though
MANAGEMENT SYSTEM, MONITORING APPARATUS AND METHOD THEREOF

BACKGROUND OF THE INVENTION

1. Field of the Invention

The present invention relates to a system that monitors a status of an image forming apparatus, and more particularly, relates to an acquisition of information from the image forming apparatus.

2. Description of the Related Art

A management system is conventionally known that collects operational information, which includes counter information indicating a number of printed sheets and a number of uses of parts and the like of an image forming apparatus connected to a network, failure information indicating faults and abnormalities such as paper jams, and remaining amount information indicating change of a remaining amount of consumables. The management system is constituted by a monitoring apparatus installed on a network of client destinations on which image forming apparatuses are installed, and a management apparatus that remotely manages the image forming apparatuses and the monitoring apparatus in centralized manner (Japanese Patent Application Laid-Open No. 2007-018500).

In the management system, two types of configurations for transmitting operational information of the image forming apparatuses to the management apparatus are available. The one is a configuration in which the image forming apparatus itself directly transmits the operational information to the management apparatus, and the other is a configuration in which the monitoring apparatus collects the operational information and the like from the image forming apparatuses, and thereafter, collectively transmits them to the management apparatus.

As described above, in the management system of the configuration in which the image forming apparatus itself directly transmits the operational information to the management apparatus, there is a problem that processing load at the time of receptions in the management apparatus is large, when a huge number of the image forming apparatuses are installed. In order to reduce the processing load, it is conceivable to additionally install the above-described monitoring apparatus as a relaying apparatus to the client's network.

Further, appropriate distribution of processing loads may be carried out by devising means of collecting the operational information, when image forming apparatuses are newly added to an environment in which the monitoring apparatus is already installed, depending on communication functions which the image forming apparatuses have.

SUMMARY OF THE INVENTION

The present invention is directed to, among other things, appropriate techniques for transmitting the operational information from the image forming apparatus to the monitoring apparatus, when an environmental change occurs within a system, such as, for example, switching a transmission destination of the operational information of the image forming apparatus from the management apparatus to the monitoring apparatus.

According to an aspect of the present invention, a management system includes an image forming apparatus, and a monitoring apparatus that collects operational information from an image forming apparatus of a monitoring target, and transmits it to an external management apparatus. The monitoring apparatus includes an acquisition unit configured to acquire functional information from an image forming apparatus that is a monitoring target, a determination unit configured to determine whether the image forming apparatus is equipped with a transmission control function for performing change of a transmission destination of the operational information, and voluntarily performing transmission of the operational information to the transmission destination, based on the functional information acquired by the acquisition unit, a transmission unit configured to transmit to the image forming apparatus determined as being equipped with the transmission control function by the determination unit, a command for setting the monitoring apparatus as a transmission destination of the operational information, and transmission setting in which, with regards to a plurality of types of the counter information related to charging, among the operational information which should be collected, a scheme for acquiring the information in response to a request from the monitoring apparatus is set, and with regard to failure information, a scheme for acquiring the information by voluntarily transmitting by the image forming apparatus is set, and a verification unit, upon acquiring the information by requesting the plurality of types of the counter information related to charging from the image forming apparatus, configured to verify matching in the plurality of types of the counter information. The image forming apparatus is configured to perform transmission of the operational information to the monitoring apparatus in accordance with the command and the transmission setting received from the monitoring apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a table relating to transmission setting which the monitoring apparatus holds.

FIG. 8 is an example of a table relating to a collecting method of operational information of each image forming apparatus which the monitoring apparatus holds.

FIG. 10 is an example of information (table) concerning transmission setting.

DESCRIPTION OF THE EMBODIMENTS

Various exemplary embodiments, features, and aspects of the invention will be described in detail below with reference to the drawings.

Figure 1:
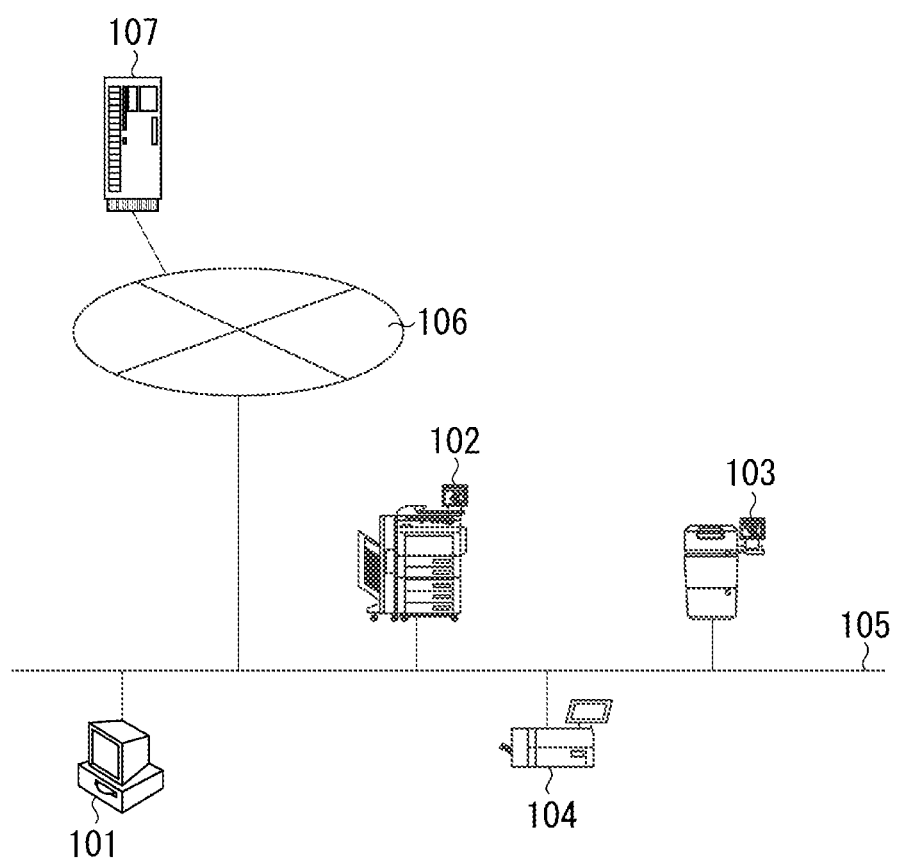
FIG. 1 illustrates an example of a system in the present invention.

FIG. 1 illustrates an example of a configuration of a management system in the present invention. A monitoring apparatus 101 is provided within a local system as a client network on which image forming apparatuses, which become monitoring targets of client destinations or the like, are installed. Then, the monitoring apparatus 101 transmits operational information acquired from the image forming apparatuses to the management apparatus 107 by way of the Internet 106. The operational information includes counter information indicating a number of printed sheets or a number of uses of constituent parts, failure information such as errors or jams, and history information such as an environmental log. Image forming apparatuses 102, 103, and 104 become the monitoring targets in the management system. A printer or a multi-function peripheral equipped with a scanner function and FAX function is an example of the image forming apparatus, and processing described below relating to the present invention is applicable to any device.

A management apparatus 107 manages the monitoring apparatus and the image forming apparatuses in centralized manner from remote places. With regard to management contents, transmission schedules of the counter information are set for the monitoring apparatus, and types of information to be collected among the operational information are set for the image forming apparatuses and the monitoring apparatus. The management apparatus 107 will be connected to many client networks via the Internet 106, and will manage a huge number of monitoring target devices. The management apparatus 107, if notified from the image forming apparatus that a serious failure event has occurred, performs notification processing or the like for arranging maintenance crew.

In this process, counter information among the operational information to be managed by the management apparatus, is information to be periodically transmitted. The counter information includes a number of printed sheets used for charging or the like. When the number of printed sheets is managed, even the number of printed sheets by each division, or each user may be managed in some cases, in addition to a total number of printed sheets processed by the image forming apparatus. In this case, if a strict management is required, for use in charging, for example, it is necessary to assure matching between a total number of printed sheets processed by the image forming apparatus, and a sum of the number of printed sheets by each division (each user).

Hence, in a case where the monitoring apparatus is installed within a local system, it is conceivable, when these numbers of printed sheets are acquired as counter information, to store them temporarily, and if matching is verified, to transmit the counter information to the management apparatus.

Further, in the case where the image forming apparatus itself transmits the counter information to the management apparatus, without relaying the monitoring apparatus, it is necessary to secure an area for temporarily retaining information to be transmitted within a storage area of the image forming apparatus in order to verify the matching. However, securing sufficient area for verification in the image forming apparatus leads to cost increase of the apparatus itself, and it is difficult for some image forming apparatuses (e.g., lower-cost versions or single function printer) to implement the area for verification. Further, a method is conceivable, for verifying the matching at the management apparatus side which has collected information, and subsequently managing the collected operational information as official information. With this method, however, the processing load is large for the management apparatus that manages a huge number of image forming apparatuses. In addition, since each apparatus is installed at remote places, retransmission of information takes place in order to achieve the matching, which might invite an increase of network traffic.

On the other hand, event data or the like indicating occurrence of an event that necessitates maintenance in the image forming apparatus is included in the failure information among the operational information to be managed by the management apparatus. With regard to the event data, it is desired to promptly notify the management apparatus after occurrence of the event in order to minimize downtime (non-operational time) of the image forming apparatus.

In the present first exemplary embodiment, in view of the above-described situations, appropriate collection technique according to a type of information to be transmitted is applied, depending on change of system environment, such as when a new image forming apparatus is installed, or transmission destinations of the operational information of the image forming apparatus is switched from the management apparatus to the monitoring apparatus.

In the management system in FIG. 1, it is assumed that the monitoring apparatus 101 is newly installed. The monitoring apparatus 101, when connected with the image forming apparatuses 102 to 104 which have been set as the monitoring targets, collects the operational information via a network 105 from the image forming apparatuses. In the exemplary embodiment, two types of collection schemes of information by the monitoring apparatus are used; a scheme (pull scheme) for acquiring the operational information from the image forming apparatus in response to a request from the monitoring apparatus, and a scheme (push scheme) for acquiring the operational information which the image forming apparatus is going to voluntarily transmit to the monitoring apparatus.

Figure 2:
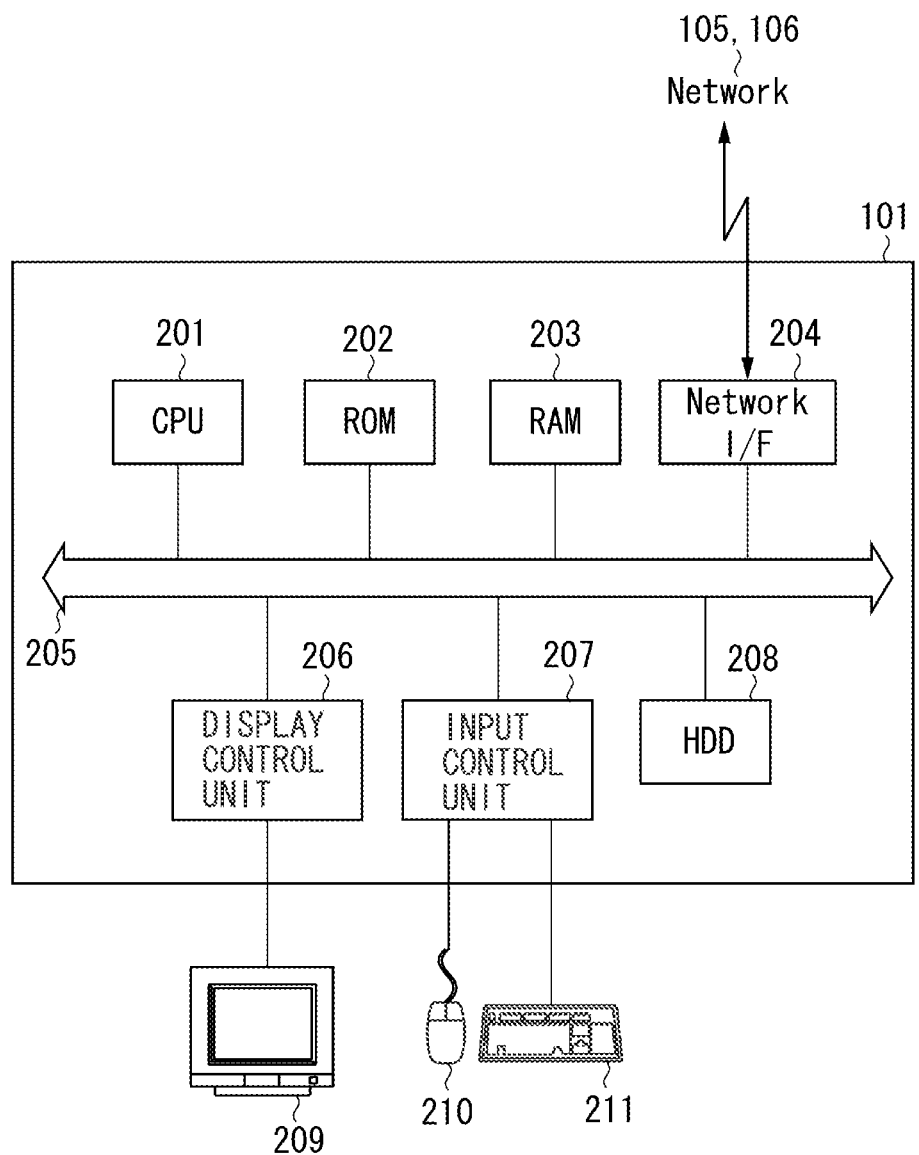
FIG. 2 illustrates a hardware configuration example of a monitoring apparatus in the present invention.

FIG. 2 is a hardware configuration diagram of the monitoring apparatus 101. A central processing unit (CPU) 201 controls the entire monitoring apparatus 101. A ROM 202 is a read-only memory for storing a boot program necessary for start of system or various types of programs for implementing monitoring processing or the like. A random access memory (RAM) 203 is used as a work memory or the like needed when a program is executed by the CPU 201. A network I/F 204 performs communication with the image forming apparatuses, and becomes a component for performing communication via the management apparatus 107 and the Internet 106. A display unit 209 is connected to a display control unit 206, and input units 210 and 211 are connected to an input control unit 207. Information which is necessary for operating a system including information from the management apparatus 107 will be input and output through the input and output devices 209 to 211. A hard disk drive (HDD) 208 stores programs and application information and the like executed by the CPU 201. Further, in the configuration discussed here the components are connected to a system bus 205.

Figure 3:
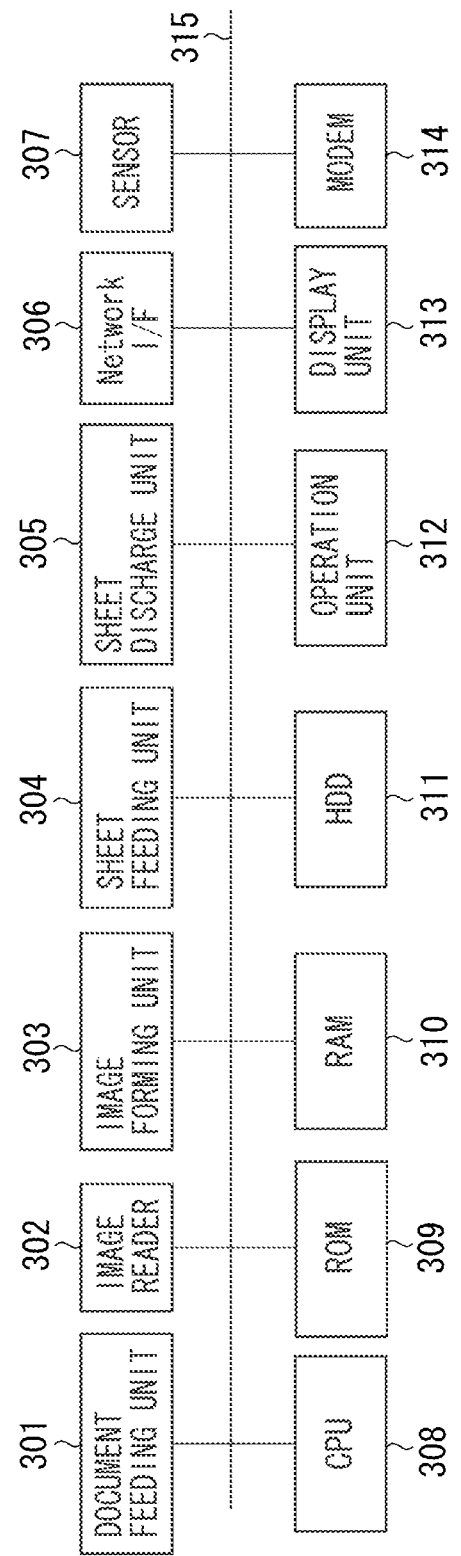
FIG. 3 illustrates a hardware configuration example of an image forming apparatus in the present invention.

FIG. 3 is a hardware configuration diagram of the image forming apparatuses 102 to 104 utilized in the present exemplary embodiment. A document feeding unit 301 automatically feeds documents to an image reader 302, and documents are read by the image reader (scanner) 302. An image forming unit 303 converts and prints the read documents and data received from the network or the like into images to be printed. A sheet feeding unit 304 feeds paper sheets for print. A sheet discharge unit 305 performs post-processing such as sorting or stapling of printed sheets, and discharges them. A network I/F 306 is connected to the LAN or the Internet or the like, to perform external communication. A sensor 307 detects a status of each part of the image forming apparatus. A CPU 308 controls the entire image forming apparatus. A ROM 309 stores a boot program needed for start of a system and various types of programs for implementing various types of processing. A RAM 310 is used as a work memory or the like which is required when data is temporarily stored or when a program is executed by the CPU 201. An HDD 311 stores operational information including programs involved in various types of processing and various types of information detected within the apparatus itself, and user information externally transmitted, and the like. An operation unit 312 accepts instruction inputs. A display unit 313 displays operational information of the apparatus itself and information related to operations in the operation unit 312 and the like. A modem 314 connects to connection lines for external connections. A system bus 315 interconnects respective components discussed here.

In the present invention, the exemplary embodiments are applicable to an apparatus other than the apparatus configuration illustrated in FIG. 3, more specifically even to an image forming apparatus, in which operations, or mechanisms of the image reader 302, the image forming unit 303, and the modem 314 are different from those in FIG. 3, or they are not included as components.

Figure 4:
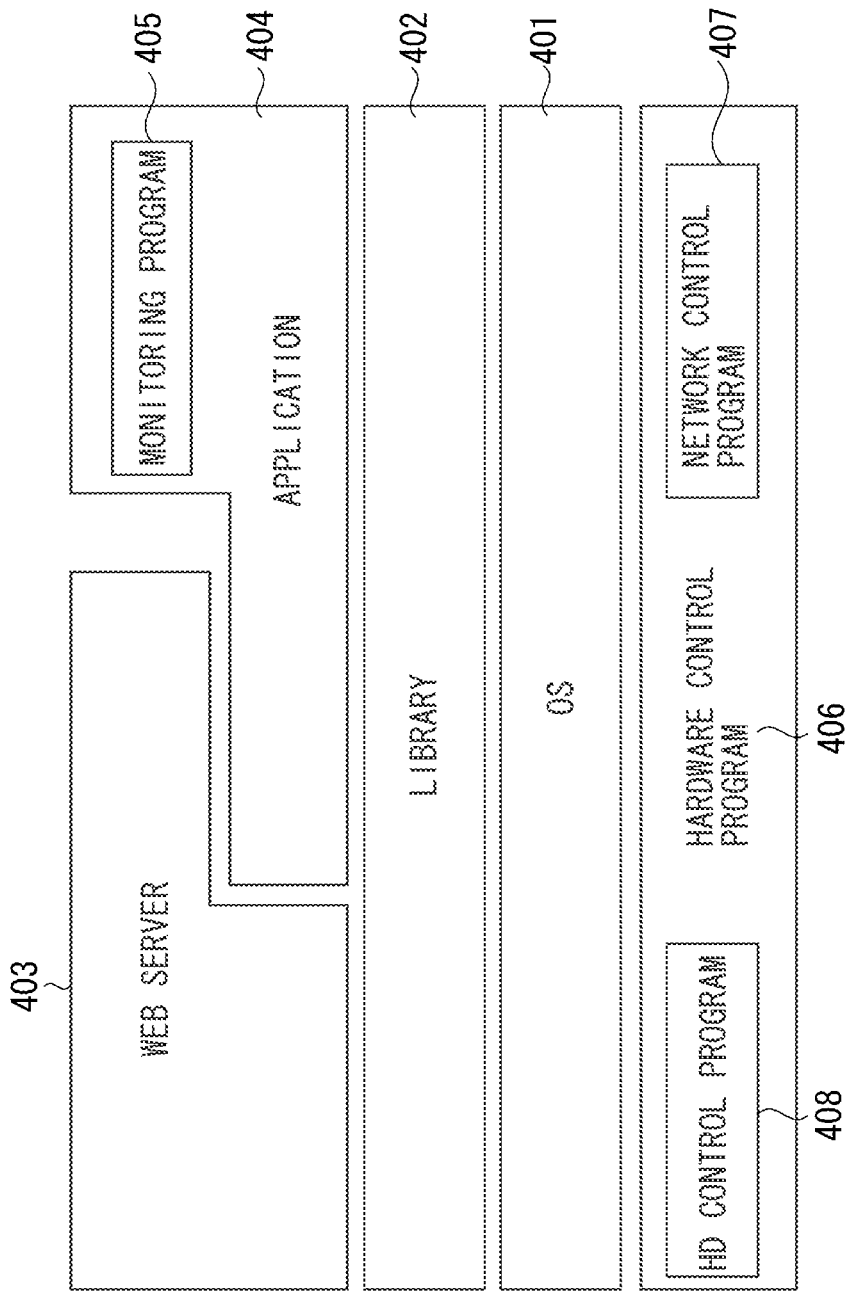
FIG. 4 illustrates a software configuration example of the monitoring apparatus in the present invention.

FIG. 4 is a software block diagram of the monitoring apparatus 101. The monitoring apparatus 101 includes an operating system (OS) 401, a library 402, a web server 403, and an application 404. As apart of the application, a monitoring program 405 for performing management of information concerning the image forming apparatus, and control based on information from the management apparatus 107 is included. As a part of a hardware control program 406, a network control program 407, and a hard disk (HD) control program 408 are included.

Figure 5:
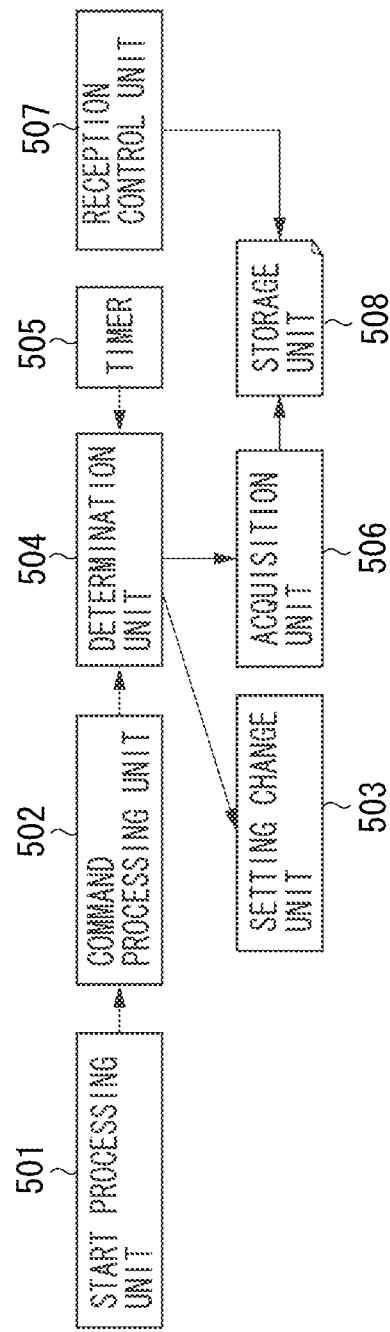
FIG. 5 illustrates a relation among modules of the monitoring apparatus in the present invention.

FIG. 5 is a modules relation diagram of the monitoring apparatus 101. A CPU of the monitoring apparatus 101 executes the monitoring program 405, thereby the monitoring apparatus 101 will function as modules 501 to 508.

The start processing unit 501 controls processing at the time of start of the monitoring program. The start processing unit 501 calls the command processing unit 502. The command processing unit 502 accepts commands such as change of the image forming apparatus which should be a monitoring target, and change of a collection method of the operational information from the image forming apparatus, and performs control in accordance with the command. For example, upon accepting an addition of an image forming apparatus which should be the monitoring target, the command processing unit 502 makes a request via the network I/F 204 for acquiring information used for determination of a collection method from the image forming apparatus.

A determination unit 504 determines whether a collection method depending on a type of information acquired from the image forming apparatus is a push scheme or a pull scheme, based on information acquired in response to the above-described request of the command processing unit 502. The determination unit 504 notifies the setting change unit 503 of the determined collection method. Then, the setting change unit 503 performs change of transmission setting relating to information collection of the image forming apparatus. Device information (network information or function information) of the image forming apparatus as the monitoring target which becomes a target of change by the setting change unit 503, and the transmission setting relating to information collection are stored, and managed by the HDD 208 or the like. The transmission setting are transmitted as change instructions to the image forming apparatus which is the monitoring target, by the setting change unit 503. Further, when the command processing unit 502 receives change request of an acquisition method of the operational information from the image forming apparatus which is already defined as the monitoring target, a collection method according to the request is determined by the determination unit 504. With regard to the collection method determined here, setting processing by the setting change unit 503 is performed in a similar manner.

The determination unit 504 starts processing by notification from the timer 505, and issues to the acquisition unit 506, an acquisition request of the operational information of the image forming apparatus. At this time, the collection method of the operational information is a pull scheme. The acquisition unit 506 acquires the designated information from the image forming apparatus by transmitting an acquisition request to the image forming apparatus. At this time, the acquisition request is performed by the pull scheme, namely a type of information contained in the operational information which needs to be acquired, is designated. The storage unit 508 causes the acquired information to be stored in the RAM 203, or the HDD 208.

On the other hand, the reception control unit 507 awaits a notification of the operational information by the push scheme from the image forming apparatus. The storage unit 508 causes the information received by the reception control unit 507 to be stored in the RAM 203, or the HDD 208.

Figure 6:
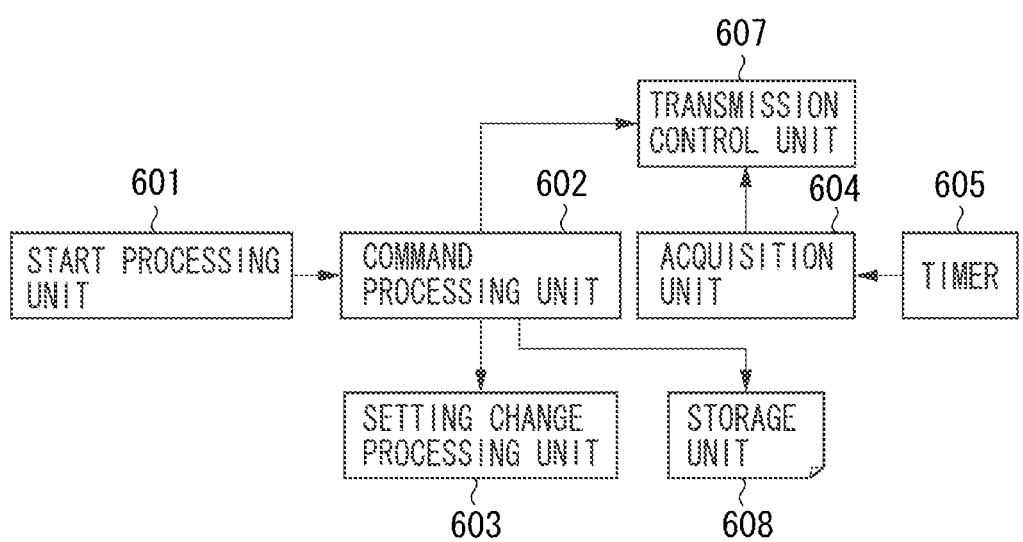
FIG. 6 illustrates a relation among modules of the image forming apparatus in the present invention.

FIG. 6 is a modules relation diagram of the image forming apparatuses 102 to 104. Also in the image forming apparatus, the CPU 308 executes a control program (not illustrated) for monitoring, thereby functioning as modules 601 to 608.

The start processing unit 601 controls processing at the time of start of the monitoring function of the image forming apparatus according to the above-described control program. The start processing unit 601 calls the command processing unit 602. The command processing unit 602 accepts, analyzes, and processes a command from the monitoring apparatus 101 by way of the operation unit 312, or the network I/F 306.

If a command accepted by the command processing unit 602 is analyzed as transmission setting for designating a transmission destination of the operational information, and a type of information which needs to be transmitted, from the monitoring apparatus 101, the storage unit 608 stores the analysis result in the HDD 311 or the like. On the other hand, if a command accepted by the command processing unit 602 is change instruction of already-stored information of transmission destinations, the setting change processing unit 603 makes a request to the monitoring apparatus 101 for information concerning new transmission setting. The command processing unit 602, upon receiving, as a response, information concerning the transmission setting from the monitoring apparatus 101, passes the information to the setting change processing unit 603. The setting change processing unit 603 causes the storage unit 608 to update the stored information based on the received transmission setting, issues a notification that the setting change is completed, and transmits it to the monitoring apparatus 101 via the command processing unit 602. Further, the command processing unit 602 allows a user to accept change of the transmission destination, and the transmission setting of the operational information, from the operation unit 312. With regard to this case also, the setting change processing unit 603 performs communication with the monitoring apparatus 101, based on change instruction, and performs setting change.

The acquisition unit 604 starts processing by the notification from the timer 605 which follows the transmission setting, and acquires information of which collection method is push scheme, from the HDD 311. The acquired information is transmitted to the monitoring apparatus 101 by the transmission control unit 607. Some image forming apparatuses may not be equipped with the function of transmission control by the acquisition unit 604 and the transmission control unit 607. The information which needs to be transmitted here, includes counter information which is not related to charging such as a number of uses of parts, and some information of the operational information such as firmware information. When faults such as paper jams or abnormalities are detected, it is desirable to acquire these pieces of information as failure information, and to transmit them to the monitoring apparatus 101 by the transmission control unit 607.

On the other hand, the command processing unit 602, upon accepting acquisition request of the operational information from the monitoring apparatus 101, acquires necessary information from the HDD 311, based on a type of information designated by the request, and generates transmission information. The transmission control unit 607 transmits the transmission information to the monitoring apparatus 101. In this process, as information to be transmitted, at least counter information concerning charging (e.g., a total number of printed sheets, a number of printed sheets by each user and each division) is included.

FIG. 7 is an example of a corresponding table between transmission methods and transmission information, which indicates transmission setting of the image forming apparatus of the monitoring target relating to collection of the operational information, which the monitoring apparatus 101 retains in the RAM 203, or the HDD 208.

As illustrated in rows of the present table 701, each transmission method name, a number of types of information which becomes transmission targets by its method, identification information which identifies meaning of the information transmitted by its method, and accompanying information concerning the transmitted information are designated. Accompanying information herein used indicates, if a plurality of types of information is transmitted by one method, whether verification of matching with regards to the information is necessary ("1") or unnecessary ("0").

A Method1 702 is a method for notifying status change, in which one type of information is included. As an example of specific status change, failure information such that paper jam has occurred, or paper jam has been resolved, will be transmitted by this method. A Method2 703 is a method for notifying error information occurred in the image forming apparatus and a total number of printed sheets at the point when the error has occurred. Two types of information, namely, failure information concerning failures that occurred and the total number of printed sheets (number of printed sheets 1) are included therein. With regard to the information transmitted by this method, verification of matching is not required. A Method4 705 is a method for notifying a number of uses of parts, and the number of uses of parts is included as one type of information.

A Method3 704 is a method for notifying two types of the numbers of printed sheets. This includes specifically, the total number of printed sheets related to charging (number of printed sheets 1), and the number of printed sheets on user-by-user basis (number of printed sheets 2). Since these pieces of information require verification of matching by the monitoring apparatus 101, a value of "1" is set for the accompanying information. Basically, if a total number of printed sheets, and a sum of numbers of printed sheets on user-by-use basis coincide with each other, it follows that the matching has been verified. In this method, during information acquisition from a certain image forming apparatus, if print processing or the like is being executed in the image processing apparatus, the matching will not be achieved in some cases. If the matching could not be achieved, re-acquisition of the information will be performed.

FIG. 8 is an example of a table relating to a collection method of the operational information of the image forming apparatus of the monitoring target which the monitoring apparatus 101 retains. A content of this table is written, for example, when the monitoring apparatus 101 newly adds an image forming apparatus as the monitoring target.

As illustrated in a row of table 801, device ID for identifying each image forming apparatus which becomes the monitoring target, and a collection method of each transmission method are associated with each other. For example, a row 802 indicates an image forming apparatus of which device ID is A0001, and represents that the monitoring apparatus 101 acquires information from the image forming apparatus by the pull scheme, in all transmission methods of the method1 to the Method4 illustrated in FIG. 7. The image forming apparatus is not equipped with a transmission control function for implementing transmissions of the operational information by the push scheme. As a result, the image forming apparatus is set to transmit all pieces of information according to a request from the monitoring apparatus 101.

A row 803 indicates an image forming apparatus of which device ID is A0002, and in the transmission methods of the Method1, Method2, and Method4, the push scheme is designated for information collection. On the other hand, in the transmission method of the Method3, the row 803 represents that the monitoring apparatus 101 acquires the information (the total number of printed sheets, and the number of printed sheets on user-by-user basis) from the image forming apparatus by the pull scheme.

Figure 9:
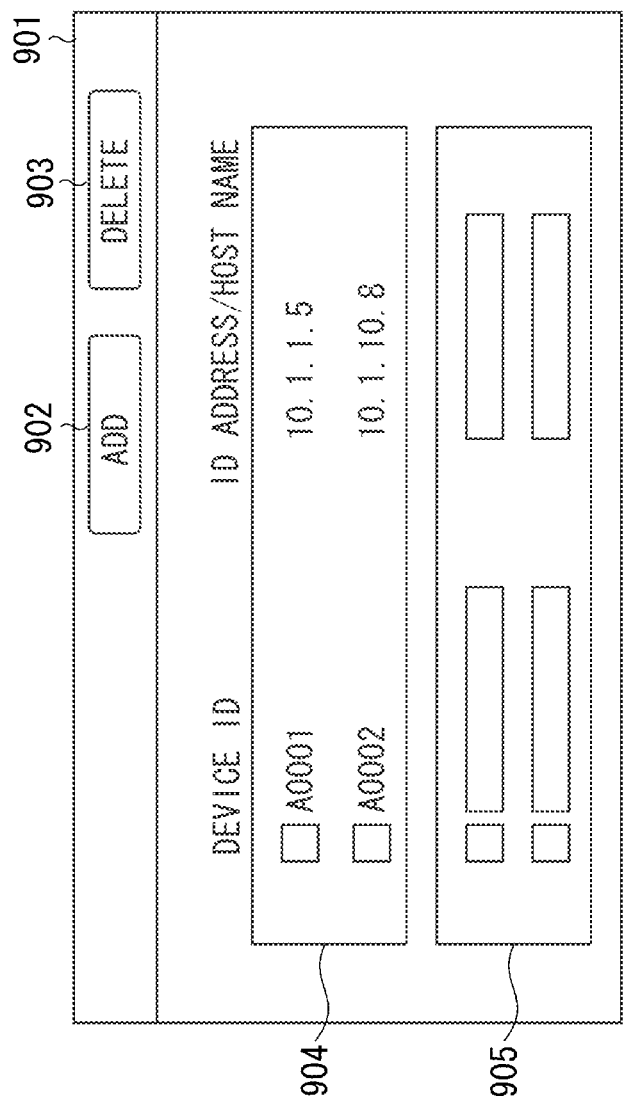
FIG. 9 is an example of an operation screen of the monitoring apparatus.

FIG. 9 is an example of an operation screen (screen 901) for accepting operations of addition and deletion of the image forming apparatus of the monitoring target, which the monitoring apparatus 101 provides. The screen 901 is displayed by the display control unit 206, and operation on the screen is accepted, and processed in the command processing unit 502.

A button 902 is used to add a designated image forming apparatus as a monitoring target. A button 903 is used to delete the designated image forming apparatus from the monitoring target. A list 904 lists the information of the image forming apparatuses, which are the monitoring targets at present. Device IDs, and IP addresses (or information such as a fully qualified domain name (FQDN), a network basic input/output system (NetBios) name) are displayed. A region 905 is used to input information of the image forming apparatus to be added as the monitoring target. By inputting the information such as device ID, and IP address, and designating the add button 902, the image forming apparatus will be newly registered as the monitoring target.

FIG. 10 is an example of information (table) concerning transmission setting of the operational information, which is transmitted to the image forming apparatus of the monitoring target from the monitoring apparatus 101. The image forming apparatus will receive the information, and perform transmission control of the operational information which follows the transmission setting. In the present table 1001, as illustrated in a row, there are included transmission method names, flags which indicate whether they should be transmitted by the push scheme, base point times and transmission intervals which indicate timings of transmissions. Here, the present table specifically represents transmission setting relating to the image forming apparatus of the device ID "A0002" in FIG. 8. The transmission timings are not limited to those designated in the present table, but it is also possible to designate specified date and time of every month or the like.

Information 1002 and 1003 relates to transmission setting of the method1 and method2, respectively. The value of "1" is set in the flag, which means a transmission target by the push scheme.

Since transmission information illustrated in the Method1 and Method2 indicates status change or error notification, there is no designation of a predetermined transmission interval ("−1"). This means that its failure information or the like is transmitted when a particular event occurs. On the other hand, information 1005 relates to transmission setting of the method4. The value of "1" is set in the flag, which means a transmission target by the push scheme. Moreover, transmission timing of the transmission information is designated every 72 hours from base point time.

Information 1004 relates to transmission setting of the Method 3. A value of "0" is set in the flag, which means it is not transmission target by push scheme. As illustrated in FIGS. 7 and 8, this information is transmitted in response to a request from the monitoring apparatus 101 (pull scheme).

Hereinbelow, processing when the monitoring apparatus 101 registers the image forming apparatus as the monitoring target will be described in detail with reference to FIGS. 11 to 13.

Figure 11:
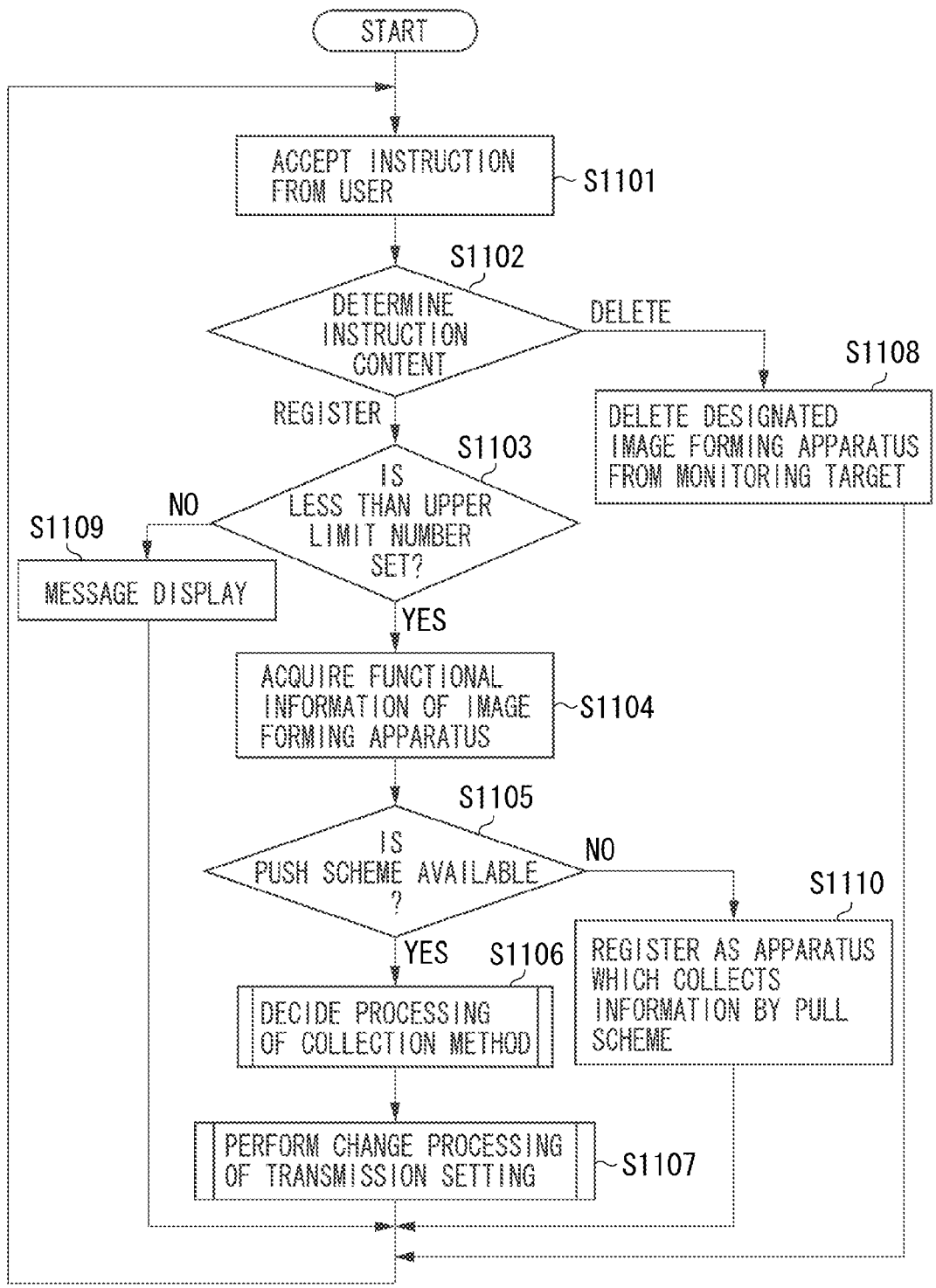
FIG. 11 is a flowchart for explaining processing when an image forming apparatus which is a management target of the monitoring apparatus is added.

FIG. 11 is a flowchart for explaining processing when the monitoring apparatus 101 newly registers an image forming apparatus as a monitoring target.

In step S1101, the command processing unit 502 accepts a content of an operation performed on the operation screen 901. In step S1102, if it is determined that the content of the operation is a registration instruction of the image forming apparatus, the processing proceeds to step S1103. With regard to the registration in this step, it is conceivable that the image forming apparatus which has been added to the network 105 is registered as the monitoring target to the monitoring apparatus 101, and that the image forming apparatus which have performed transmissions of the operational information directly to the management apparatus 107 so far is incorporated as the monitoring target of the monitoring apparatus 101. In the latter case, transmission destination of the operational information will be changed from the management apparatus 107 to the monitoring apparatus 101 through the processing since then.

In step S1102, if it is determined that the content of the operation is an instruction of deletion of the image forming apparatus from the monitoring target, the processing proceeds to step S1108. In step S1108, information of the image forming apparatus to which a deletion instruction has been given, is deleted from the table illustrated in FIG. 8, and the deletion instruction of the transmission setting is transmitted to the image forming apparatus, as the need arises. In the image forming apparatus, upon receiving the deletion instruction, the registered transmission setting are deleted. Thereafter the processing returns to step S1101, and the command processing unit 502 awaits an instruction from the user.

In step S1103, the determination unit 504 determines whether a number of the already-registered image forming apparatuses as the monitoring targets is less than an upper limit. If it is determined as less than the upper limit (YES in step S1103), the processing proceeds to step S1104. If it is determined that the upper limit has been already reached (NO in step S1103), then in step S1109, a message that a new image forming apparatus cannot be registered as the monitoring target, is displayed via the display control unit 206. Thereafter, the processing returns to step S1101, and the command processing unit 502 awaits an instruction from the user.

In step S1104, the determination unit 504 receives functional information of an image forming apparatus to which an addition instruction has been given from the command processing unit 502. The function information of the image forming apparatus is information which the command processing unit 502 has requested, and accordingly acquired from the image forming apparatus. A content of the functional information includes information which enables the determination unit 504 to determine whether the image forming apparatus is equipped with a function for enabling transmission control of the push scheme, and has a function for enabling change of transmission destination or transmission interval (schedule).

In the present exemplary embodiment, change of the transmission destination or the transmission interval is performed using a web service function which the image forming apparatus provides. To this end, more specifically, information concerning whether the image forming apparatus provides the web service function is to be contained in the functional information acquired in step S1104. At this time, if presence or absence of the web service function is to be presented by a management information base (MIB) object, the command processing unit 502 will acquire the information by a simple network management protocol (SNMP). In addition, in order to acquire information concerning general services, the information can be also acquired by a service location protocol (SLP), or a transmission control protocol (TCP) by defining a unique protocol.

In step S1105, the determination unit 504 determines whether an image forming apparatus to which an addition instruction has been given, has a function of transmission control by the push scheme, from an acquisition result in step S1104. If it is determined that the image forming apparatus has the function of transmission control (YES in step S1105), the processing proceeds to step S1106. If it is determined that the image forming apparatus does not have the function of transmission control (NO in step S1105), the processing proceeds to step S1110.

In step S1106, the determination unit 504 decides a collection method of the operational information of the image forming apparatus to which the addition instruction has been given, for each type of information. The processing will be described in detail with reference to FIG. 12. Next, in step in step 1107, the setting change unit 503 performs change processing of the transmission setting of the image forming apparatus. The processing will be described in detail with reference to the sequence diagram illustrated in FIG. 13. If the processing in step S1107 is terminated, the processing returns to step S1101, and the command processing unit 502 awaits an instruction from the user.

On the other hand, in step S1110, the setting change unit 503 registers the transmission setting as the image forming apparatus that acquires all pieces of the operational information by the pull scheme (e.g., device ID "A0001" in FIG. 8). If the processing in step S1110 is terminated, the processing proceeds to step S1101, and the command processing unit 502 awaits an instruction from the user.

Next, the details of the processing in step S1106 for deciding a collection method of the operational information will be described with reference to the flowchart in FIG. 12.

In step S1201, the determination unit 504 initializes the table illustrated in FIG. 10. In step S1202, the determination unit 504 reads one record from the table illustrated in FIG. 7, and sets the read method name for the table initialized in step S1201. In step S1203, the determination unit 504 determines whether a collection method corresponding to the transmission method is the pull scheme, based on a value of accompanying information of the read record. If a value of the accompanying information is "1", information acquired by the transmission method requires verification of matching after acquisition. Therefore, the subject method is determined here as a transmission method for performing information acquisition by the pull scheme, in order to perform check of the matching at the monitoring apparatus 101 side. Then, in step S1204, the value of "0" is set for the flag, and transmission by the push scheme is prevented from being performed. On the other hand, if a value of the accompanying information is "0", the information to be acquired by the transmission method does not necessitate verification of matching after the acquisition. Therefore, the method is here determined as a transmission method by which the information should be voluntarily transmitted to the monitoring apparatus 101 from the image forming apparatus (push scheme). Then, in step S1205, the value of "1" is set for the flag, and transmission by the push scheme is performed by the image forming apparatus. Further, together with the flag setting, if transmission information by the transmission method is the one which should be periodically transmitted (e.g., a number of uses of parts), information for deciding transmission date and time is set. In the present exemplary embodiment, as described above, base point time and transmission interval are set. Further, if it is transmission information such as status change or error notification, a value of "−1" is set, which is an invalid value as the transmission interval.

Next, in step S1206, the determination unit 504 updates the table illustrated in FIG. 8. More specifically, the determination unit 504 sets a device ID of the image forming apparatus to which an addition instruction has been given, and a collection method (push scheme or pull scheme) of the transmission method determined in step S1203.

In step S1207, it is determined whether processing with respect to all transmission methods registered on the table in FIG. 7 have been performed. If it is determined that unprocessed transmission methods are present (NO in step S1207), the processing returns to step S1202. If it is determined that all transmission methods have been processed (YES in step S1207), the processing is terminated.

Figure 12:
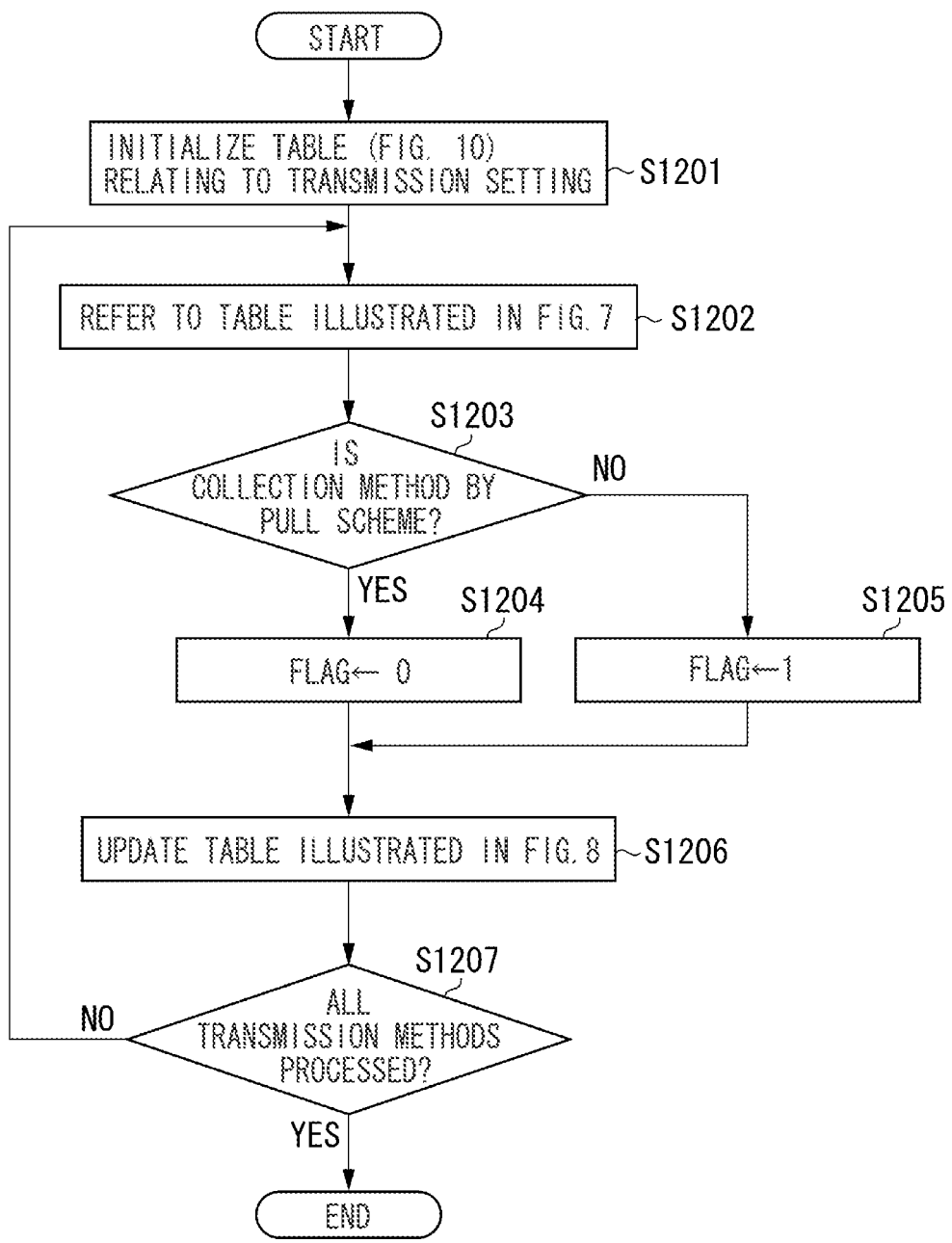
FIG. 12 is a flowchart for explaining processing when the information illustrated in FIG. 10 is created.
Figure 13:
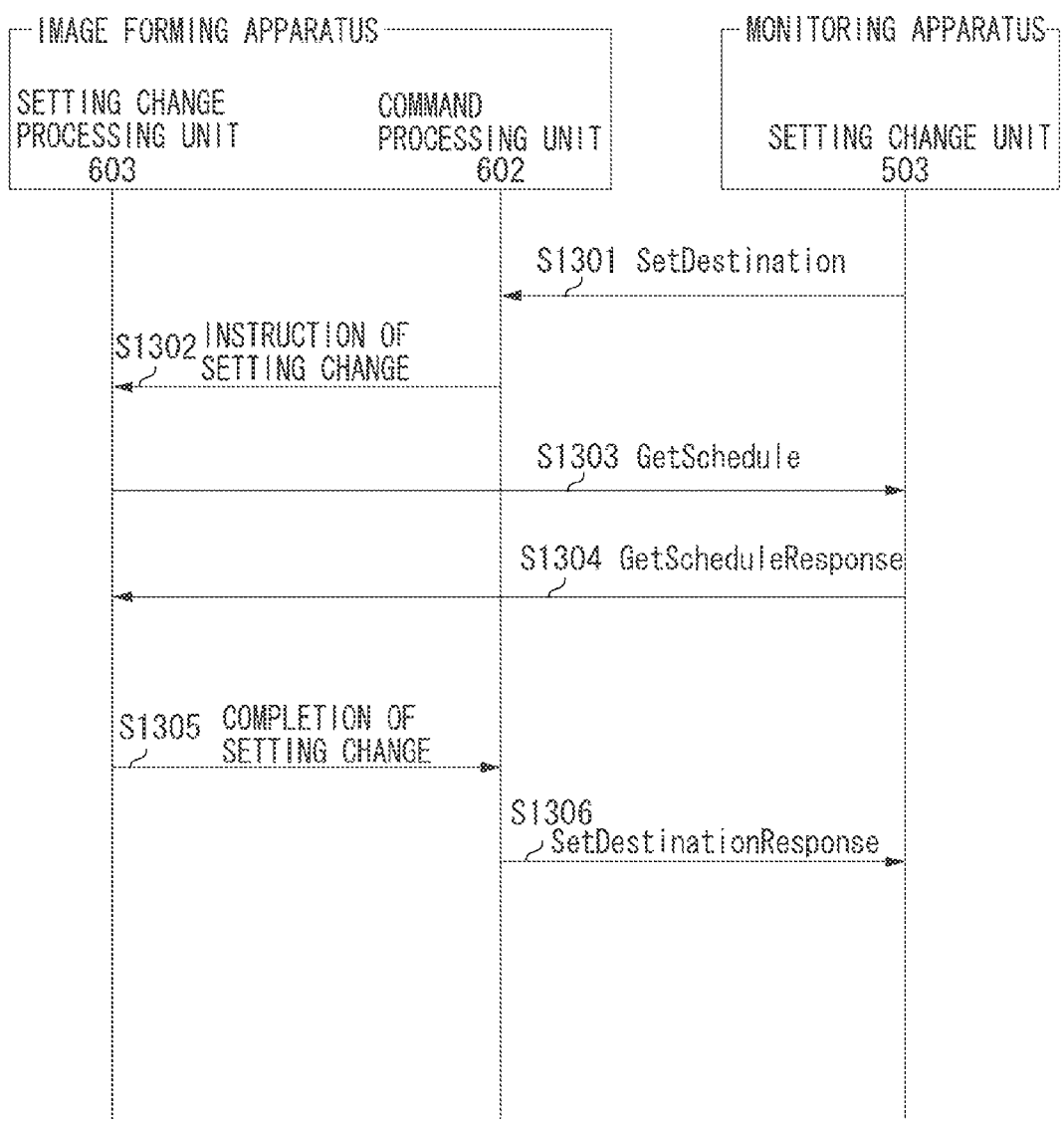
FIG. 13 is a sequence diagram for explaining processing relating to setting changes of the monitoring apparatus and the image forming apparatus.

When the processing described in FIG. 12 is terminated, a table relating to the created transmission setting will be notified to the image forming apparatus, by the setting change unit 503. The setting change processing (in step S1107) related to the notification will be described in detail with reference to FIG. 13.

In step S1301, the setting change unit 503 transmits a set destination command to the image forming apparatus for setting, or changing a transmission destination of the image forming apparatus for or to the monitoring apparatus 101. In this process, processing for changing transmission destination of the operational information from the management apparatus 107 to the monitoring apparatus 101 is assumed.

In step S1302, the command processing unit 602 analyzes the received command, and notifies the setting change processing unit 603 of having received the change instruction of the transmission destination of the operational information.

The setting change processing unit 603 changes the already-registered transmission destination of the operational information to the monitoring apparatus 101 based on the command received in step S1302. Next, in step S1303, the command processing unit 602 transmits a Get Schedule command to the monitoring apparatus 101, via the command processing unit 602.

In step S1304, the setting change unit 503 transmits information concerning the transmission setting set by the processing described in FIG. 12, to the monitoring apparatus 101, as a response (Get Schedule Response). In the monitoring apparatus 101, the command processing unit 602 receives the response, and notifies the setting change processing unit 603.

The setting change processing unit 603 performs change of the transmission setting, based on the information concerning the transmission setting transmitted as the response (Get Schedule Response). Then, in step S1305, the setting change processing unit 603 notifies the command processing unit 602 of a completion of the setting change. In step S1306, the command processing unit 602 transmits the monitoring apparatus 101 that the setting change has been completed, as a response (Set Destination Response) of set destination in step S1301.

Hereinbefore, according to the present exemplary embodiment, a transmission technique of appropriate operational information has been applied, depending on an environmental change (e.g., a new installation of an image forming apparatus) of the management system. More specifically, instruction of the transmission setting has been issued from the monitoring apparatus 101 to the image forming apparatus which can transmit the operational information by the push scheme, and can change the transmission destination. In the transmission setting here, it is decided whether the monitoring apparatus requests and collects information by pull scheme, or the information is transmitted from the image forming apparatus by push scheme, depending on whether the information which should be transmitted by each transmission method necessitates verification of matching. By such processing, a processing load in the monitoring apparatus can be reduced by voluntarily transmitting the information which does not necessitate verification of matching, from the image forming apparatus, even when many image forming apparatuses are connected to and monitored by the monitoring apparatus, in consideration of a load reduction of the management apparatus. Therefore, efficiency of processing of the entire management system will be enhanced with respect to collection of the operational information.

Figure 14:
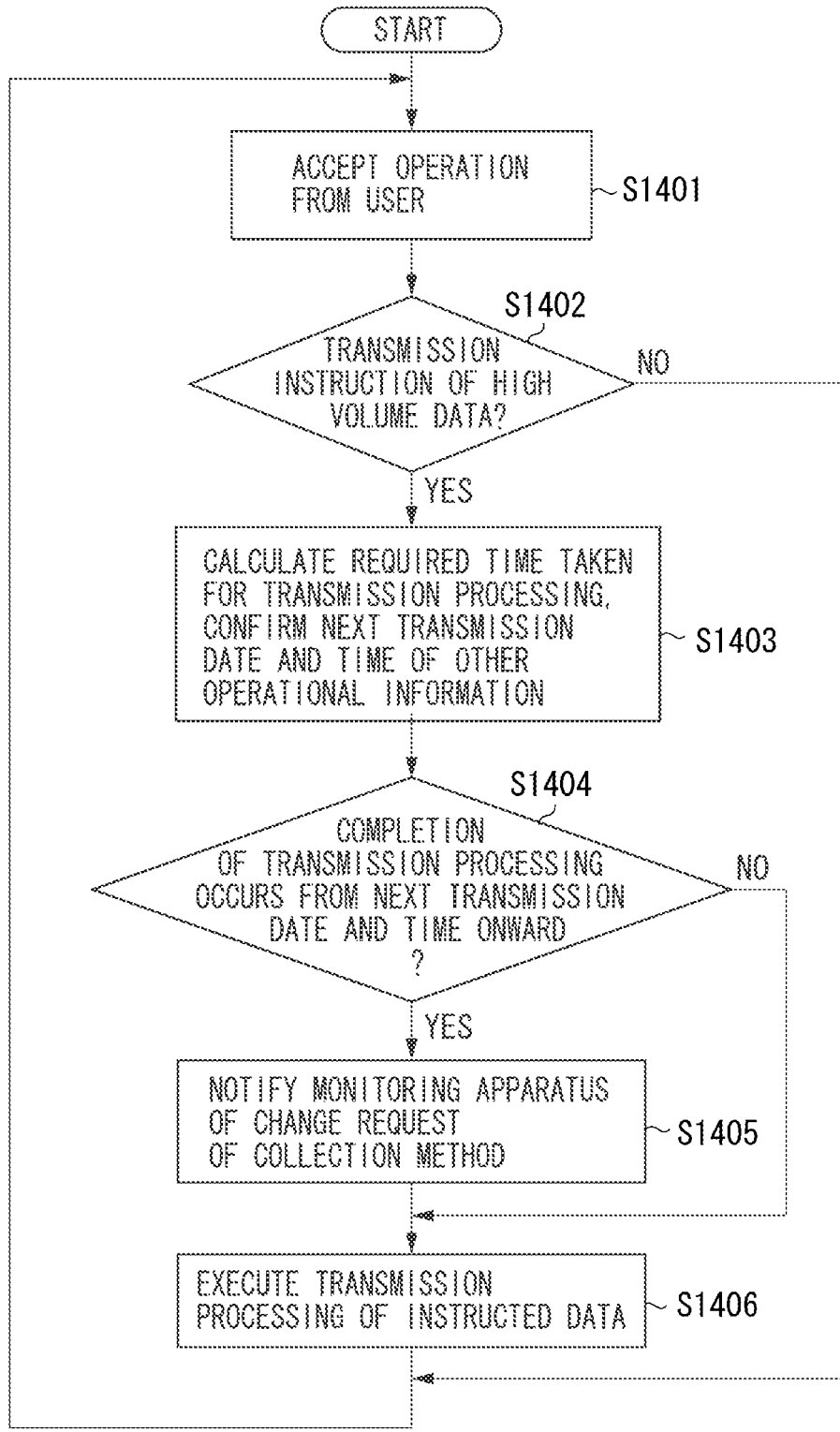
FIG. 14 is a flowchart for explaining processing when a transmission setting is changed from the image forming apparatus.

In the present second exemplary embodiment, control for changing a collection method of the operational information from the image forming apparatus as the monitoring target will be described with reference to FIG. 14. In FIG. 14, descriptions are given with regard to the processing in which the command processing unit 602 and the setting change processing unit 603 play main roles.

First, in step S1401, the command processing unit 602 accepts an operation from a user, via the operation unit 312. In step S1402, the command processing unit 602 determines whether the accepted operation is a transmission instruction of high-volume data. The data, for which the transmission instruction is accepted in this process, includes information involved in adjustment of color print of the image forming apparatus. This information is large in size. In step S1402, if it is determined that the accepted operation is the transmission instruction of the high-volume data (YES in step S1402), the processing proceeds to step S1403. If not (NO in step S1402), the command processing unit 602 stands by until an operation is performed from the user. If the operation is performed, the processing returns to step S1401.

In step S1403, the command processing unit 602 calculates a required time taken to perform transmission processing of the data, for which the transmission instruction has been accepted. Then, the command processing unit 602 refers to the transmission setting of other operational information already stored, and confirms a transmission date and time of the next transmission. In step S1404, the command processing unit 602 determines whether a completion of the transmission processing accepted in step S1401 comes at the next transmission date and time or later, of other operational information. This is determination processing for identifying a type of the operational information which has possibility for delay or failure in the transmission, depending on the user's operation. In step S1404, if it is determined that the completion of the transmission processing is at the next transmission date and time or later (YES in step S1404), the processing proceeds to step S1405. If it is determined that the completion is not at the next transmission date and time or later (NO in step S1404), the processing proceeds to step S1406. In step S1405, the setting change processing unit 603 transmits a request for switching a collection method of the operational information from the push scheme to the pull scheme, to the monitoring apparatus 101.

The monitoring apparatus 101, upon receiving a request for switching between the collection methods, changes the table illustrated in FIG. 8 according to a notification content. Further, in cancelling the switching between the collection methods, the monitoring apparatus 101 may cancel it at the time of acquisition, or the cancellation instruction may be notified from the image forming apparatus to the monitoring apparatus 101.

Then, in step S1406, the command processing unit 602 acquires information instructed from the HDD or the like, and executes transmission processing.

Hereinbefore, according to the present exemplary embodiment, when it is determined that transmission of the operational information according to the transmission setting becomes non-executable, by an operation accepted from the user in the image forming apparatus, the collection methods are dynamically switched. Thereby, it becomes possible to prevent delay of transmission of the operational information to the monitoring apparatus or the management apparatus.

Embodiments of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program may be provided to the computer for example via a network or from a recording medium of various types serving as the memory device (e.g., computer-readable medium). Such a system or apparatus, and the recording medium where the program is stored, are included as being within the scope of the present invention. The memory device may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-025867 filed Feb. 8, 2010, which is hereby incorporated by reference herein in its entirety.

What is claimed is:

1. A management system including an image forming apparatus, and a monitoring apparatus that collects operational information from an image forming apparatus of a monitoring target, and transmits it to an external management apparatus, wherein the monitoring apparatus comprising:

an acquisition unit configured to acquire functional information from an image forming apparatus that is a monitoring target;

a determination unit configured to determine whether the image forming apparatus is equipped with a transmission control function for performing change of a transmission destination of the operational information, and voluntarily performing transmission of the operational information to the transmission destination, based on the functional information acquired by the acquisition unit;

a transmission unit configured to transmit to the image forming apparatus determined as being equipped with the transmission control function by the determination unit, a command for setting the monitoring apparatus as a transmission destination of the operational information, and transmission setting in which, with regards to a plurality of types of the counter information related to charging, among the operational information which should be collected, a scheme for acquiring the information in response to a request from the monitoring apparatus is set, and with regard to failure information, a scheme for acquiring the information by voluntarily transmitting by the image forming apparatus is set; and a verification unit, upon acquiring information by requesting the plurality of types of the counter information related to charging, from the image forming apparatus, configured to verify matching in the plurality of types of the counter information, wherein the image forming apparatus is configured to perform transmission of the operational information to the monitoring apparatus in accordance with the command and the transmission setting received from the monitoring apparatus.

2. A monitoring apparatus that collects operational information from an image forming apparatus of a monitoring target, and transmits it to an external management apparatus, the monitoring apparatus comprising:

an acquisition unit configured to acquire functional information from the image forming apparatus that is the monitoring target;

a determination unit configured to determine whether the image forming apparatus is equipped with a transmission control function for performing change of a transmission destination of the operational information, and voluntarily performing transmission of the operational information to the transmission destination, based on the functional information acquired by the acquisition unit; and a transmission unit configured to transmit to the image forming apparatus determined as being equipped with the transmission control function by the determination unit, a command for setting the monitoring apparatus as a transmission destination of the operational information, and transmission setting in which, with regards to a plurality of types of the counter information related to charging, among the operational information which should be collected, a scheme for acquiring the information in response to a request from the monitoring apparatus is set, and with regard to failure information, a scheme for acquiring the information by voluntarily transmitting by the image forming apparatus is set.

3. The monitoring apparatus according to claim 2, wherein the image forming apparatus which is the monitoring target is a newly installed image forming apparatus, or an image forming apparatus in which a transmission destination of the operational information is changed from the management apparatus to the monitoring apparatus.

4. The monitoring apparatus according to claim 2, further comprising:
   a verification unit, upon acquiring information by requesting a plurality of types of counter information related to charging from the image forming apparatus, configured to verify matching in the plurality of types of the counter information.

5. The monitoring apparatus according to claim 2, wherein the plurality of types of counter information related to the charging includes a total number of printed sheets in the image forming apparatus, a number of printed sheets by each user who utilizes the image forming apparatus, and a number of printed sheets by each division which utilizes the image forming apparatus.

6. The monitoring apparatus according to claim 2, wherein, with regard to counter information which indicates a number of uses of parts, a scheme for collecting the information by voluntarily and periodically transmitting by the image forming apparatus is set in the transmission setting.

7. The monitoring apparatus according to claim 2, further comprising:
   a changing unit configured to change a collection scheme of operational information of the type that a scheme is set for collecting the information by voluntarily transmitting by the image forming apparatus in the transmission setting, in response to a request from the image forming apparatus of the monitoring target, to a scheme for temporarily collecting in response to a request from the monitoring apparatus.

8. A method in the monitoring apparatus that collects operational information from an image forming apparatus of a monitoring target, and transmits it to an external management apparatus, the method comprising:
   acquiring functional information from the image forming apparatus which is the monitoring target; and
   determining whether the image forming apparatus is equipped with a transmission control function for performing change of a transmission destination of the operational information, and voluntarily performing transmission of the operational information to the transmission destination, based on the acquired functional information, and transmitting to the image forming apparatus determined as being equipped with the transmission control function by the determining, a command for setting the monitoring apparatus as a transmission destination of the operational information, and transmission setting in which, with regard to a plurality of types of counter information related to charging, among the operational information which should be collected, a scheme for collecting the information in response to a request from the monitoring apparatus is set, or, with regard to failure information, a scheme for collecting the information by voluntarily transmitting by the image forming apparatus is set.

9. A computer readable storage medium storing a computer program that causes a computer to execute a method for a monitoring apparatus that collects the operational information from the image forming apparatus of the monitoring target, and transmits it to an external management apparatus, the method comprising:
   acquiring functional information from an image forming apparatus which is a monitoring target;
   determining whether the image forming apparatus is equipped with a transmission control function for performing change of a transmission destination of the operational information, and voluntarily performing transmission of the operational information to the transmission destination, based on the acquired functional information, and transmitting to the image forming apparatus determined as being equipped with the transmission control function by the determining, a command for setting the monitoring apparatus as a transmission destination of the operational information, and transmission setting in which, with regard to a plurality of types of counter information related to charging, among the operational information which should be collected, a scheme for collecting the information in response to a request from the monitoring apparatus is set, or, with regard to failure information, a scheme for collecting the information by voluntarily transmitting by the image forming apparatus is set.

10. An image forming apparatus connected to a monitoring apparatus that collects operational information from an image forming apparatus of a monitoring target, and transmits it to an external management apparatus, the image forming apparatus comprising:
    a response unit configured to send functional information as a response to a request from the monitoring apparatus;
    a reception unit configured to receive a command for setting the monitoring apparatus as a transmission destination of the operational information, and transmission setting in which a scheme for collecting the operational information is set; and
    a transmission unit configured to transmit the operational information to the monitoring apparatus in accordance with the received transmission setting,
    wherein the transmission unit, with regard to a plurality of types of the counter information related to charging, transmits it in response to a request from the monitoring apparatus, and with regard to failure information, voluntarily transmits it when a failure occurs.

11. A method in an image forming apparatus connected to a monitoring apparatus that collects operational information from an image forming apparatus of a monitoring target, and transmits it to an external management apparatus, the method comprising:
    sending functional information as a response to a request from the monitoring apparatus;
    receiving a command for setting the monitoring apparatus as a transmission destination of the operational information, and transmission setting in which a scheme for collecting the operational information is set; and
    transmitting the operational information to the monitoring apparatus in accordance with the received transmission setting,
    wherein, with regard to a plurality of types of counter information related to charging, the transmitting unit transmits the information in response to a request from the monitoring apparatus, and with regard to failure information, voluntarily transmits it when a failure occurs.

12. A computer readable storage medium storing a computer program that causes a computer to execute a method for an image forming apparatus connected to a monitoring apparatus that collects operational information from the image forming apparatus of a monitoring target, and transmits it to an external management apparatus, the method comprising:
  sending functional information as a response to a request from the monitoring apparatus;
  receiving a command for setting the monitoring apparatus as a transmission destination of the operational information, and transmission setting in which a scheme for collecting the operational information is set; and
  transmitting the operational information to the monitoring apparatus in accordance with the received transmission setting,
  wherein, with regard to a plurality of types of counter information related to charging, the transmitting unit transmits the information in response to a request from the monitoring apparatus, and with regard to failure information, voluntarily transmits it when a failure occurs.

13. A monitoring apparatus that collects operational information from an image forming apparatus of a monitoring target, and transmits it to an external management apparatus, the monitoring apparatus comprising:
  an acquisition unit configured to acquire functional information from an image forming apparatus that is a monitoring target;
  a determination unit configured to determine whether the image forming apparatus is equipped with a transmission control function for performing change of a transmission destination of the operational information, and voluntarily performing transmission of the operational information to the transmission destination, based on the functional information acquired by the acquisition unit; and
  a transmission unit configured to transmit transmission setting in which a scheme for collecting the information in response to a request from the monitoring apparatus corresponding to a type of the operational information which should be collected, or a scheme for collecting by voluntarily transmitting the information by the image forming apparatus is set, to an image forming apparatus determined as being equipped with the transmission control function by the determination unit, and setting the monitoring apparatus as a transmission destination of the operational information.

* * * * *